Feb. 18, 1941.    F. E. RINEHART    2,231,949

FISHING LURE

Filed Dec. 19, 1939

INVENTOR.
FRED ELMUS RINEHART
BY
ATTORNEY.

Patented Feb. 18, 1941

2,231,949

UNITED STATES PATENT OFFICE 2,231,949

FISHING LURE

Fred Elmus Rinehart, Newark, Ohio

Application December 19, 1939, Serial No. 309,994

11 Claims. (Cl. 43—48)

My invention relates to artificial fishing lures, and more particularly to lures which closely resemble the flies, bugs and insects on which many kinds of fish like to feed.

This application is a continuation-in-part of my application Serial No. 164,380, filed September 17, 1937 for Artificial lures.

Artificial fishing lures of many and varied types are in common use today. However, those which are designed to resemble flies and insects frequently represent complicated and expensive constructions. Many that have a satisfactory appearance in a dry condition, lose their attractiveness after a period of time in water; and few possess any simulation of the movements of a fly or bug in or on the water.

Accordingly, it is a general object of my invention to provide a simple and inexpensive fishing lure which closely resembles one of the flies, bugs or insects on which fish like to feed.

A further object of my invention is to provide a device which not only resembles in appearance a bug or insect, but which also possesses certain natural or life-like movements and wiggles when attached to a leader and moved in or on the water.

Another object of my invention is to provide a lure which will maintain its attractiveness and luring characteristics possessed when dry, after it becomes wet.

Still another object of my invention is to provide a lure in which the body portion is simply and conveniently secured to the shank of a fish hook, or held in a substantially fixed position on the shank of the hook.

Additional objects of my invention and novel features of construction will be apparent from the following description and claims when considered together with the accompanying drawing, in which like parts are designated by like reference characters, and in which:

Figure 1:
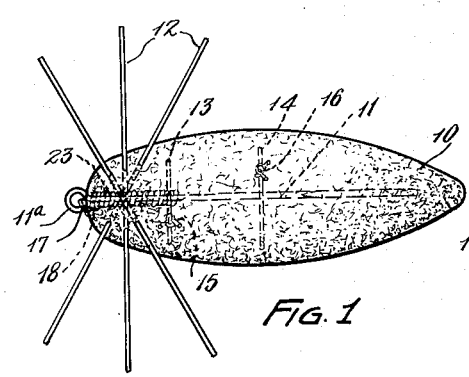
Fig. 1 is a top plan view of a lure embodying my invention.
Figure 2:
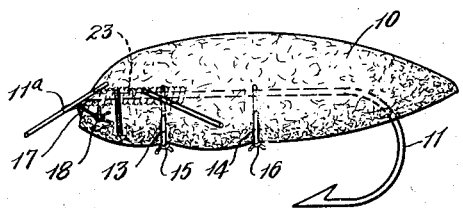
Fig. 2 is a side elevational view of the lure shown in Fig. 1.
Figure 3:
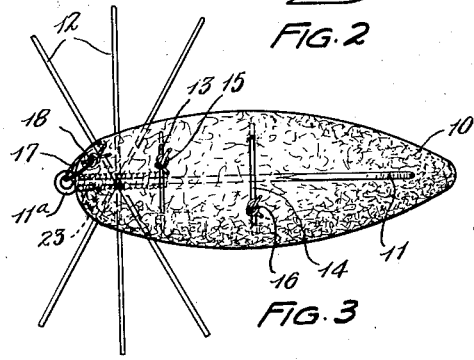
Fig. 3 is a bottom view of the lure shown in Figs. 1 and 2.

With particular reference to Figs. 1 to 3, the numeral 10 designates a body of my artificial lure which is preferably formed or cut in the general representation of the body outline of a water bug, insect or fly, as shown. To simplify the construction, I prefer to make the body of one piece of material. The body may be made of any soft, deformable material, such as soft rubber, chenille, fine sponge, or the like, and also may be of any desired color. I have found that excellent results may be secured when the body is made of sponge rubber with either a smooth or rough, porous surface. The smooth surface type of sponge rubber does not absorb or take up water and is consequently very satisfactory for the body of a lure to be used on the surface of water. The entrapped air or gas in this type of sponge rubber is helpful to cause the lure to float on the surface of the water. On the other hand, a body made of sponge rubber having a natural, rough, porous surface will absorb water like a sponge, when squeezed to expel the air and immersed in water. This gives the lure added weight which causes it to sink in the water, the depth depending on the amount of water absorbed by the body. Thus a lure with a body of this type may be used either as a surface lure or an underwater lure without the need of added weight.

By making the body of soft, deformable material, I provide a lure that can be simply and conveniently used for a variety of purposes by fishermen, and a lure that fish can bite and swallow, yet without injury to the lure. Also, a body of this type of material lends itself to the addition of other features that improve its luring characteristics, as later described.

The size of the body should be such as to generally resemble a water bug, insect or fly, and yet be large enough to be able to absorb a sufficient amount of water to cause the lure to sink, if an underwater lure is desired. While the body may vary somewhat in its shape and still represent the body outline of a bug, fly or insect, I prefer to use a substantially rounded or curved body, with a somewhat flattened bottom, not only because of its appearance, but also because I have discovered that such a body more readily lends itself to the production of life-like wiggles and movements when the lure is attached to a leader and moved in or on the water.

A fish hook 11, having an eye 11a to which a leader may be attached, is cooperatively associated with the body 10 of my lure in a manner to be described later.

In order to give the body more luring characteristics, members 12, representing antennae, legs or feelers, may be attached to the body 10. While various materials of various colors may be used for these antennae or leg forming members, I have found that the use of highly flexible material, such as string rubber, allows a sustained motion or wiggling of the members when in or on the water, thus giving a more natural or lifelike appearance to the lure. These antennae or leg forming members may be tied to the body by bands which encircle or partially encircle the body (the use of which bands I later describe), or each member may be drawn or threaded through the body so as to make lengths of these members on each side of the body, as shown. I have found that the threading of these antennae or leg forming members through the body gives a simple and secure method of attaching them because the resiliency of the body, particularly when made of rubber or sponge, binds the feelers in a fixed position on the body. Also, I have found that such construction permits a more natural action and motion of the antennae or leg members than when they are tied or otherwise secured to the body.

Although the drawing shows the use of three members to form six legs or feelers, obviously more or less members may be used to form more or less legs or feelers; or this element of the lure might be omitted altogether. The drawing indicates these leg or feeler forming members are threaded through the body so as to cross over each other somewhere within the body. I do not wish to be limited in my invention to this construction alone, since obviously these members could be threaded through the body in such a way as not to cross each other, or in such a way that some members might cross each other and other members not cross each other.

In order to aid the appearance of my lure and to assist in producing life-like movements and wiggles when it is moved in or on water, band means 13 and 14 are placed on the bottom part of the body 10 as shown more clearly in Figs. 2 and 3. Each band means is passed through the body 10 immediately above the shank of fish hook 11, and a small section of the band means is exposed on the outside of the bottom part of the body. The two ends of each band means are tied so as to produce knots 15 and 16. The band means 13 and 14 may comprise various materials such as cotton, linen, or other textile threads, rubber, or other elastic material. I have found that thread is very satisfactory for this purpose.

I have discovered that when the knots 15 and 16 are placed in a predetermined position with relation to each other and the lure body, they act to produce life-like motions and wiggles in the lure when it is attached to a leader and moved in or on water. These desired motions may be obtained when the knots are placed so as not to be in a straight line parallel with the shank of the hook when viewing the body longitudinally from the eye of the hook, and are placed so that the lure is off balance. Good results are obtained when the knots are placed on opposite sides of the perpendicular center line of the body and below the horizontal center line of the body, maintaining such a relative position between the knots that the lure is off balance to some degree. I have found that excellent results are obtained when the knots are placed on the bottom or underneath side of the body and not in a line parallel with the shank of the hook as shown in Fig. 3.

Although I have shown in the drawing the use of two band means 13 and 14, additional band means may be used, particularly when the body is relatively large in size, or satisfactory results can be obtained with one band means, particularly when associated with another cord 17 and knot 18. Said cord 17 is passed through the eye 11a of the hook 11 and through the body 10, the two ends of the cord being tied together to form knot 18. Ample space remains in the eye 11a of the hook to secure a leader thereto. The cord 17 may be of any suitable material, such as the thread used in band means 13 and 14 as previously explained. The knot 18 is preferably placed on the bottom or underneath side of the body and out of line with the knots in the band means as shown in Fig. 3, or out of line with the knot in a single band means when used, as previously explained. The use of cord 17 and knot 18 produces satisfactory results as far as the desired life-like movements are concerned when one band means and knot are used, particularly when the lure body is small. However, the cord 17 and knot 18 may be advantageously employed with more than one band means, as I have shown in Figs. 1 to 3.

Figure 5:
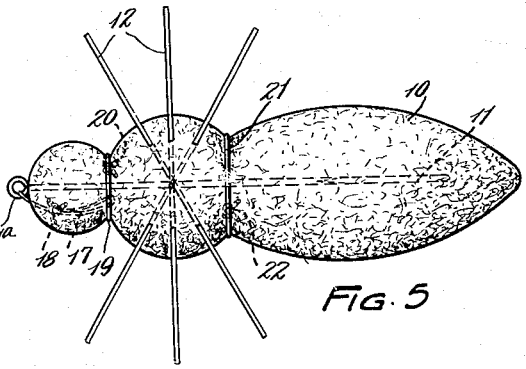
Fig. 5 is a top plan view of a further modification of my lure shown in Figs. 1 to 3.
Figure 4:
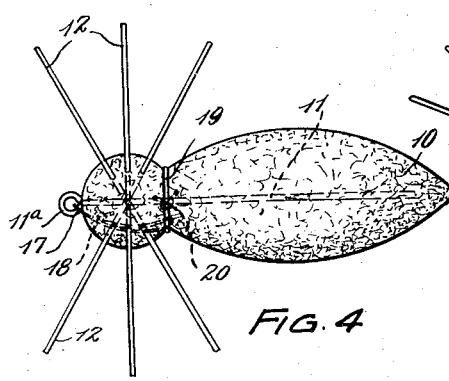
Fig. 4 is a top plan view of a modification of my lure shown in Figs. 1 to 3.

The band means 13 and 14 have only a small portion exposed on the outside of body 10, substantially less than half of the circumference of the body. However, it may be desirable to use the band means to shape and divide the body, as shown in Figs. 4 and 5. With such construction, I use band means 19 encircling the body 10 with the two ends of the band means tied so as to form knot 20. The knot 20 is placed on the lower part of the body and cooperates with knot 18, previously described, to produce life-like movements in the lure. More than one encircling band means may be used, if desired, as illustrated in Fig. 5. In addition to band means 19 with knot 20, a band means 21 encircling the body 10 may be used, with the two ends of the band means tied to form knot 22. Then the knots 18, 20 and 22 when placed to make the lure off balance, as previously explained, will cooperate to produce life-like movements in the lure when it is attached to a leader and moved in or on water. When a plurality of encircling band means are used, good results are obtainable from the knots 20 and 22 on the underside of the body 10 without the use of knot 18. Additional band means like 19 and 21 may be employed with knots placed therein and positioned with respect to each other as I have previously explained so as to produce desired natural movements of the lure.

It will be apparent that in each band means additional knots might be tied beyond the knot produced by tying the two ends of the band means, so as to produce a plurality of knots in a single band means. This construction produces satisfactory results, but by preferred construction is the use of one knot in each band means.

Figure 6:
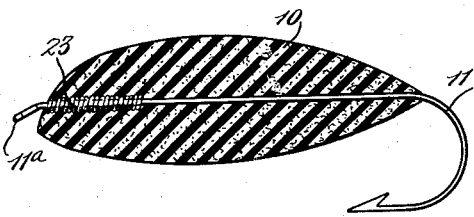
Fig. 6 is a longitudinal sectional view through a lure of my present invention illustrating a means for securing the body and hook together.

Unless the body 10 is held in a more or less fixed position on the shank of the fish hook 11, it will tend to slip down the shank so as to interfere with the effective use of the bight part of the fish hook. The cord 17, previously described, may serve to secure the body 10 to the hook 11 with satisfactory results. However, a stronger and more secure method is shown in Fig. 6. In this construction, I wrap a thread or cord 23 snugly around a section of the shank of hook 11, and a loop or knot may be placed in the thread or cord at the end of the winding to hold it in position on the hook. The thread member is then coated with a suitable adhesive or cement, and the body 10 placed in its desired position by forcing it over the sharp end of hook 11 on to the shank and surrounding the coated thread. When the adhesive dries or sets, the body is firmly bonded to the thread, and the frictional grip of the thread on the shank of the hook aided by the adhesive prevents any movement of the body on said shank. The lure shown in Fig. 6 has the body cemented in place, and to this construction may be added the antennae or leg forming members and the band means with knots, and possibly the extra cord 17, all as previously described.

Figure 7:
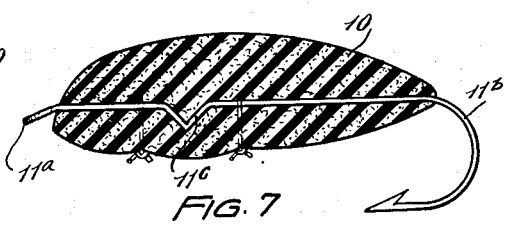
Fig. 7 is a longitudinal sectional view through a lure of my present invention illustrating another means for securing the body and hook together.

Fig. 7 illustrates another method of securing the body to the shank of the hook against subsequent movement. This construction involves the use of a fish hook 11b with an eye 11a and a V section or offset portion 11c contained in the shank of the hook. The body 10 is placed in the desired position as shown by forcing it over the sharp end of hook 11b and on to the shank so that the offset portion or hump in the shank is embedded in the body. While this construction is normally sufficient to hold the body against movement on the shank of the hook, the use of the band means previously described may assist in holding the body in its desired position.

Figure 8:
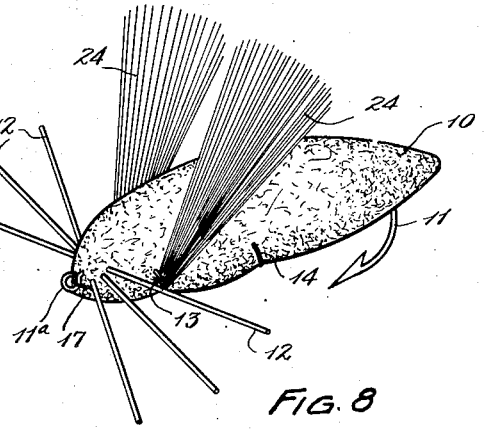
Fig. 8 is a perspective view of my lure shown in Figs. 1 to 3 with the addition of wings.

Fig. 8 illustrates my lure when used with the addition of wings 24 to increase the resemblance of the lure to a live fly or insect. Such wings are preferably secured to the body by the band means 13 or by other cord or thread passed into the body. They may be of various materials such as feathers, hair, or vein rubber, though it is advantageous that the material be impervious to water.

Excellent results may be obtained from the details of construction disclosed, and they are therefore preferred; but it is understood that minor changes may be made within the scope of my invention.

I claim:

1. An artificial luure comprising a fish hook with an eye, a body of soft, deformable material mounted on the shank of said hook, band means dividing said body into a plurality of sections, knots tied in said band means and placed so that the lure is off balance, elongated and highly flexible threads secured to said body and projecting laterally therefrom and forming legs simulating the legs or antennae of a live fly, bug or the like and designed so as to quiver when the lure is used in fishing, a cord one end of which is passed through said body and one end through the eye of said hook, the two ends being tied together to form a knot, and means for cooperatively securing said body and said hook together.

2. An artificial lure comprising a fish hook, a body of soft, deformable material mounted on the shank of said hook, band means dividing said body into a plurality of sections, knots tied in said band means and placed so that the lure is off balance, elongated and highly flexible threads secured to said body and projecting laterally thereof and forming legs simulating the legs or antennae of a live fly, bug or the like and designed to quiver when the lure is used in fishing, and means for cooperatively securing said body and said hook together.

3. An artificial lure comprising a fish hook, a body member of soft, deformable material mounted on the shank of said hook, band means dividing said body into a plurality of sections, knots tied in said band means and placed so that the lure is off balance, and antennae forming members secured to said body.

4. In an artificial lure, a fish hook, a body member of soft, deformable material mounted on the shank of said hook, band means dividing said body into a plurality of sections, and knots tied in said band means and placed so that the lure is off balance.

5. An artificial lure comprising a fish hook, a body member of soft, deformable material mounted on the shank of said hook, band means dividing said body into a plurality of sections, knots tied in said band means and placed so that the lure is off balance, and means for cooperatively securing said body and said hook together.

6. An artificial lure comprising a fish hook with an eye, a body member of soft, deformable material mounted on the shank of said hook, band means dividing said body into a plurality of sections, knots tied in said band means and placed so that the lure is off balance, and a cord one end of which is passed through said body and one end through the eye of said hook, the two ends being tied together to form a knot.

7. In an artificial lure, a fish hook with an eye, a body member of soft, deformable material mounted on the shank of said hook, and means for cooperatively securing said body and said hook together, said means comprising a cord one end of which is passed through said body and one end through the eye of said hook, the two ends being tied together.

8. An artificial lure comprising a fish hook, a body member of soft, deformable material mounted on the shank of said hook, band means passed through said body and partially exposed on the bottom side of said body so as to divide the body into a plurality of sections, and knots tied in said band means and placed so that the lure is off balance.

9. An artificial lure comprising a fish hook, a body member of soft, deformable material mounted on the shank of said hook, band means encircling said body member so as to divide the body into a plurality of sections, and knots tied in said band means and placed so that the lure is off balance.

10. An artificial lure comprising a fish hook, a body member of soft, deformable material mounted on the shank of said hook, and band means passed through said body member and partially exposed on the bottom side of said member so as to divide the bottom part of the body into a plurality of sections.

11. An artificial lure comprising a fish hook, a body member of sponge rubber material having its surface sealed against absorption of liquid and mounted on the shank of said hook, and band means passed through said body member and partially exposed on the bottom side of said member so as to divide the bottom part of the body into a plurality of sections.

FRED ELMUS RINEHART.